Sept. 20, 1971    P. E. REDELMAN    3,605,443
TORQUE LIMITER
Filed Aug. 4, 1969
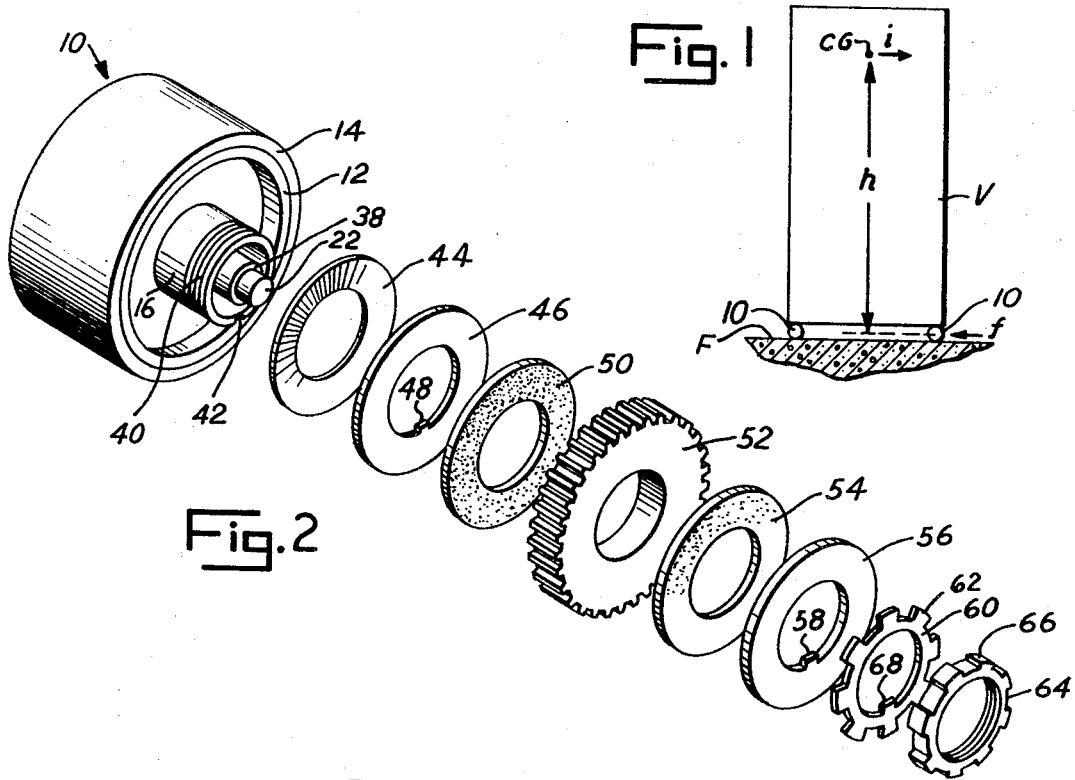
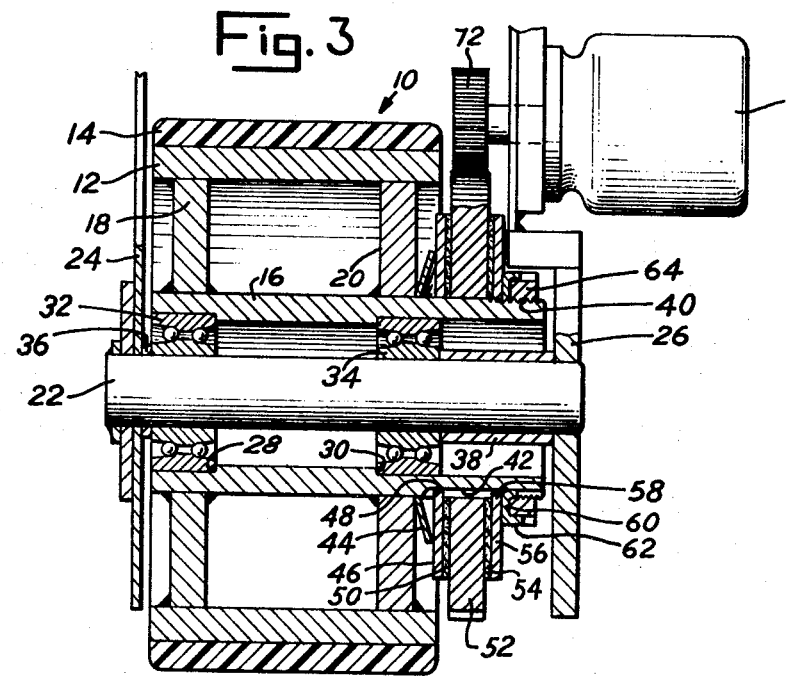
INVENTOR.
PAUL E. REDELMAN
BY
Bair, Freeman & Molinare
ATTORNEYS

… …

United States Patent Office 3,605,443
Patented Sept. 20, 1971

3,605,443
TORQUE LIMITER
Paul E. Redelman, South Holland, Ill., assignor to
Interlake Steel Corporation
Filed Aug. 4, 1969, Ser. No. 847,243
Int. Cl. F16d 7/02
U.S. Cl. 64—30
5 Claims

ABSTRACT OF THE DISCLOSURE

A torque limiter for preventing the transmission of excessive torque from the wheel of a vehicle to the vehicle in the event the wheel drive train becomes locked, which includes a pair of friction pads urged into frictional engagement with the opposite sides of the wheel drive gear so as to normally transmit driving torque to the wheel but enable the wheel to slip relative to the drive gear if the drive gear locks.

BACKGROUND OF THE INVENTION

This invention relates to a torque limiter and, more particularly, to a torque limiter for preventing the transmission of excessive torque from the vehicle wheel to the vehicle.

In vehicles which have a high center of gravity and/or which are movable horizontally at relatively high speeds upon wheels, there is a danger of tipping in the event that one or more of the wheels become locked. Such tendency to tip is a result of the mechanical couple which is set up due to the inertia force which acts through the high center of gravity in the same direction as the direction of original movement and the opposite frictional force exerted in a direction opposite the inertia force produced by the frictional drag of the locked wheel or wheels upon their rolling surface. This mechanical couple tends to cause the vehicle to tip forward in its original direction of travel.

Load carriers of the type employed in mechanized storage installations are one form of vehicle which are particularly susceptible to this problem since such load carriers are movable on wheels at relatively high speeds in the horizontal plane back and forth along the aisles of the storage installation. Also such load carriers generally employ a lift platform which may be raised to a substantial elevation resulting in a high center of gravity of the vehicle. If the load carrier is proceeding at a relatively high speed down the storage aisle and a load of substantial weight is positioned upon the lift platform and the lift platform is elevated to an upper position, a severe mechanical couple which tends to tip the load carrier will result in the event that a wheel of the load carrier becomes locked for one reason or another. Such locking might occur if the drive train to the wheel accidentally loses a tooth.

The torque limiter of my invention substantially reduces the likelihood of severe tilting mechanical couples in vehicles in the event the drive train or drive gear of the vehicle becomes locked while the vehicle is in motion. The torque limiter of my invention prevents the transmission of excessive friction generated torque from the wheel of the vehicle to the vehicle in the event the drive train locks. The torque limiter effects a substantial reduction in the friction force resulting when the drive train of a vehicle wheel becomes locked by allowing the wheel to continue to rotate. The torque limiter of my invention is simple in both operation and construction and includes a friction coupling between the drive gear and the wheel of the vehicle which couples the wheel to the drive gear for the transmission of normal driving torque but allows the wheel to slip relative to the drive gear in the event the latter becomes locked.

SUMMARY OF THE INVENTION

A preferred embodiment of the torque limiter constructed in accordance with the principles of my invention includes drive means carried by a vehicle for rotating a wheel of the vehicle and coupling means which frictionally couples the drive means and the wheel with a force sufficient to normally rotate the drive means and wheel in unison with each other, but to allow the wheel to slip relative to the drive means in the event the drive means locks.

These and other objects, features and advantages of the present invention will be more clearly understood when considering the following detailed description.

BRIEF DESCRIPTION OF THE DRAWING

In the course of this description, reference will be frequently made to the attached drawing in which:

FIG. 1 is a schematic representation of a substantially tall vehicle horizontally movable on wheels and in which the torque limiter of my invention is particularly suited for use;

FIG. 2 is an exploded perspective view of a preferred embodiment of torque limiter constructed in accordance with the principles of my invention; and FIG. 3 is a partially cross-sectioned elevation view of the assembled torque limiter and wheel assembly shown in FIG. 2.

DESCRIPTION OF THE PREFERRED EMBODIMENT

A schematic representation is shown in FIG. 1 of a vehicle V having a relatively high center of gravity CG. The vehicle is horizontally movable along the floor or other surface F upon relatively small wheels 10 at relatively high speeds. If for some reason, such as the loss of a tooth in the drive train of the wheel, the wheel becomes locked when the vehicle is in motion, the vehicle will tend to tip forward in the direction in which the load has previously been moving. If the vehicle is in motion, for example to the right as viewed in FIG. 1 and the forward wheel becomes locked, the vehicle will continue to move due to inertia and the locked wheel will frictionally drag upon its rolling surface F resulting in the generation of a frictional force indicated by arrow $f$ which is directed opposite to the original direction of travel of the vehicle. The frictional force $f$ acting upon the periphery of the wheel will generate a torque or force upon the wheel which would be transmitted through the drive train to the frame of the vehicle at its bottom. Since the center of gravity CG is spaced a substantial distance $h$ above the line of direction of the frictional force $f$, the force of inertia, indicated by arrow $i$ acting through the center of gravity will result in a substantial mechanical couple which will tend to tilt the top of the vehicle forward in the direction of travel.

The torque limiter of my invention substantially reduces the frictional force $f$ which is transmitted to the vehicle in the event the drive train becomes locked for any reason by allowing the vehicle wheel 10 to continue to rotate at least to some degree. A reduction in the force $f$ substantially reduces the tipping couple and the likelihood of undesired tipping of the vehicle.

Referring to FIGS. 2 and 3, a preferred embodiment of torque limiter and wheel of my invention is shown. The wheel 10 comprises a cylindrical annular wheel rim 12 upon which a tire 14, formed of suitable material such as polyurethane, is mounted. A tubular shaft 16 is concentrically positioned within the wheel rim 12 and is rigidly joined, as by welding to the rim by radially extending web plates 18 and 20. The tubular shaft 16 has an axial length which is somewhat longer than the width of the wheel, one end of the tubular shaft lying substantially in the plane of the wheel rim and the other end extending beyond the wheel rim. An axle 22 is mounted on and positioned between spaced frames 24 and 26 of the vehicle and a pair of shoulders 28 and 30 are cut in the inner surface of the tubular shaft 16 so as to receive suitable bearings 32 and 34 to provide for smooth rotation of the tubular shaft about the fixed axle 22. Tubular bushings 36 and 38 are fitted over the axle 22 at each end and extend between the side of the bearings opposite their respective shoulders and the frames 24 and 26 to space the wheel 10 between the frames and maintain the bearings positioned within the tubular shaft 16.

The extended end of the tubular shaft 16 is threaded at 40 adjacent its end and an axially extending keyway slot 42 is cut in the outer surface of the shaft. The slot extends from the end of the shaft 16 to a point adjacent the outer face of web plate 20. The torque limiter or coupling means comprises an annular spring washer 44 which is slipped over the extended end of the shaft 16 and slid into abutting relationship with the web plate 20. Next in order, a flat metal washer 46, having a radially inwardly extending lug 48, is slipped over the shaft 16 such that the lug is positioned in the slot 42 to prevent rotation of the washer. Washer 46 is slipped along the shaft until it contacts the outer periphery of the spring washer 44. Washer 46 is next followed on the shaft by an annular friction pad 50, composed of a suitable abrasive material, and then by the drive gear 52 which is slipped over the shaft. A second friction pad 54 and a washer 56 are then slipped upon the end of the shaft to the right of the drive gear as viewed in FIG. 3. The washer 56 also includes radially inwardly extending lug 58 which is received in the slotted keyway 42 to prevent rotation of the washer. Finally, the torque limiter assembly is completed by a lock washer 60, having a plurality of radially extending fingers 62, which is slipped over the shaft 16 and a lock nut 64 is threaded on the end of the shaft. The lock nut 64 is turned until a predetermined pressure is exerted between the nut and the spring washer 44 on the friction pads 50 and 54. Once the lock nut 64 has been threaded upon the shaft to its desired tightness, one or more of the extending fingers 62 of the lock washer 60 are bent over to lie between the ridges 66 of the lock nut 64. The lock washer 60 also carries an inwardly extending lug 68 which fits into the slotted keyway 42 to prevent the lock washer from rotating and the bent-over fingers 62, in turn, prevent the lock nut 64 from rotating to maintain the original pressure exerted by the lock nut.

It will be noted that the drive gear is not locked in the slotted keyway 42 and would be freely rotatable about the tubular shaft 16 but for the pressure exerted through the friction pads.

A drive motor 70 or the like may be attached to the frame 26 of the vehicle and is positioned to drivingly rotate the drive gear 52 by way of a pinion gear 72 or the like.

The pressure exerted upon the friction pads is adjusted by the lock nut 64 so as to urge the pads into frictional engagement with the opposed side faces of the drive gear 52 with a force sufficient to enable the drive gear, the friction pads, the washers 46 and 56 which are locked via the slotted keyway 42 to the shaft 16, the shaft 16 and the wheel 10 to be coupled and be driven in unison by the drive pinion 72. However, in the event that the drive gear 52 or the drive pinion 72 become locked, if for example a tooth in one of the gears breaks, the wheel 10 will continue to rotate and slip relative to the drive gear to substantially reduce the generation of frictional force and thereby limit the overturning couple. More specifically, the pressure exerted upon the friction pads 50 and 54 is set by the lock nut 64 to be such that if the drive gear and/or pinion gear locks, the tubular shaft 16 and the washers 46 and 56 will slip relative to the drive gear 52.

It should be understood that the embodiment of the present invention which has been described is merely illustrative of one of the applications of the principles of the invention. Numerous modifications may be made by those skilled in the art without departing from the true spirit and scope of the invention.

What is claimed is:

1. A torque limiter for preventing the transmission of excessive torque from a vehicle wheel to the vehicle and including a wheel which is adapted to rollably support the vehicle and drive means carried by the vehicle for rotating the wheel, the improvement comprising:

coupling means including a plurality of friction members frictionally coupling said drive means and said wheel with a force sufficient to normally rotate said drive means, friction members and wheel in unison with each other but to allow all of said friction members to slip relative to said wheel and said drive means in the event said drive means locks to prevent tipping of the vehicle.

2. The torque limiter of claim 1 wherein said coupling means includes spring means for exerting said force.

3. The torque limiter of claim 1 including a cylindrical shaft rigidly attached to said wheel and extending axially of the axis of rotation of said wheel, a drive gear journaled on said shaft, and wherein said friction members include annular friction pad means journaled upon said shaft and frictionally contacting at least one of the planar faces of said drive gear.

4. The torque limiter of claim 3 wherein said coupling means comprises spring means and an adjustable nut carried on said cylindrical shaft each on opposite sides of said friction pad means and drive gear.

5. The torque limiter of claim 1 including a cylindrical shaft rigidly attached to said wheel and extending axially of the axis of rotation of said wheel and having a drive gear journaled thereon and said coupling means includes annular friction pad means journaled on said shaft and annular washer means also journaled on said shaft and locked thereto, said pad means being located between said washer means and said drive gear, and spring means which bears against said washer means to urge said washer means and pad means against at least one of the faces of said gear.

References Cited

UNITED STATES PATENTS 2,857,750  10/1958  Fox _____ 64—30C

MARK M. NEWMAN, Primary Examiner

R. HEALD, Assistant Examiner